United States Patent [19]

Asai et al.

[11] Patent Number: 4,609,863
[45] Date of Patent: Sep. 2, 1986

[54] POWER SUPPLY PROVIDING STABILIZED DC FROM AN INPUT VOLTAGE OF AC SUPERPOSED ON DC WITHOUT DISTURBING THE INPUT VOLTAGE

[75] Inventors: Kachio Asai, Uji; Yuji Tsuruga, Mitaka, both of Japan

[73] Assignees: Iwatsu Electric Co., Ltd.; Rohm Company Limited, both of Japan

[21] Appl. No.: 661,994

[22] Filed: Oct. 18, 1984

[30] Foreign Application Priority Data

Oct. 25, 1983 [JP] Japan ................ 58-200475

[51] Int. Cl.[4] .............................................. G05F 5/00
[52] U.S. Cl. .................................. 323/223; 323/231; 323/299; 323/316; 307/2; 307/358
[58] Field of Search .................. 179/16 F, 18 FA, 70, 179/77, 81 R, 81 B, 170 NC; 307/2, 296 R, 297, 350, 358, 549, 567; 323/223, 225, 231, 299, 315, 316; 328/26; 330/257; 363/89, 127

[56] References Cited

U.S. PATENT DOCUMENTS 3,805,093  4/1974  Hodemaekers ............... 307/350
4,187,537  2/1980  Avicola et al. ............... 328/26
4,429,234  1/1984  Streit ........................... 307/350
4,516,081  5/1985  Katakura ...................... 330/257

Primary Examiner—William H. Beha, Jr.
Assistant Examiner—Jeffrey Sterrett
Attorney, Agent, or Firm—Pollock, VandeSande & Priddy

[57] ABSTRACT

This power supply device comprises a voltage regulating element, a constant-current source, first and second constant-current circuits, and a current switching circuit interposed between the first and second constant-current circuits and the constant-current source, and by comparing an input voltage with an output voltage to introduce constant current from the first constant-current circuit to the voltage regulating element when the input voltage is higher than the output voltage, while introducing the constant current from the second constant-current circuit to ground terminal when the input voltage is lower than the output voltage. Thus, a stabilized DC voltage may be produced from a DC voltage including a superposed AC signal without interfering with the AC communications signal.

6 Claims, 6 Drawing Figures

POWER SUPPLY PROVIDING STABILIZED DC FROM AN INPUT VOLTAGE OF AC SUPERPOSED ON DC WITHOUT DISTURBING THE INPUT VOLTAGE

BACKGROUND OF THE INVENTION

1. Field of the Invention

This invention relates to a power supply device suitable for use in a telephone set, and more particularly to a power supply device which may stabilize and produce a DC voltage with a superposed AC voice/FAX signal without interfering with the AC signal.

2. Description of the Prior Art

FIG. 1 shows a conventional power supply device for a telephone set. In this power supply device, a supply voltage is applied between input voltage terminals 2 and 4. There is provided between the input terminals 2 and 4 a full-wave rectifying circuit 14 consisting of a diode bridge constituted of diodes 6, 8, 10 and 12, and is further provided with a hybrid transformer 16 on the output side of the full-wave rectifying circuit 14.

The hybrid transformer 16 includes a plurality of coils 16A, 16B and 16C, and there is provided between the connection point of the coils 16A and 16B and the lower potential side line a transmission amplifier 20 which serves to amplify an input signal from the transmitter 18.

Further, there is provided between the connection point of coils 16B and 16C and the lower potential side line a balancing circuit network 28 comprising resistances 22 and 24 and a capacitor 26, and also a capacitor 30 is inserted in the lower potential side line between the balancing circuit network 28 and the transmission amplifier 20.

Further, there is connected between coil 16C and the lower potential side line a receiving circuit 38, a series circuit comprising a diode 32, receiver 34 and capacitor 36.

In such a power supply device as above, the hybrid transformer 16 acts to separate the direct current from the alternating current. However, use of hybrid transformer 16 makes for a large size of the power supply device, and even if the transmission amplifier 20 is formed of an integrated circuit (IC), the telephone set itself cannot be made sufficiently compact with the result of poor efficiency.

In another way in which no hybrid transformer is used, it is usual that a DC current is obtained by a constant-current circuit. However, in this method, a voltage to be supplied from the telephone exchange to a telephone set is 3 V as a DC component and 3 Vpp (peak to peak) as an AC signal component in the case of a long distance area, and it is instantaneously reduced to about 1.5 V as a minimum voltage, thereby causing a voltage in the IC unit to be reduced to about 1 V. As a result, under such a condition, it is practically impossible to supply current from the constant-current circuit to a regulated power supply and conduct signal processing of the telephone set by using the output from the regulated power supply. In particular, it is greatly difficult to conduct such signal processing without varying the impedance of the constant-current circuit.

SUMMARY OF THE INVENTION

The first objective of the present invention is to provide a power supply device which can stabilize and produce a DC voltage which includes a superposed AC signal without using a conventional hybrid transformer.

This first objective may be achieved by the following method. That is, the power supply device comprises a constant-current source for generating constant current, a voltage regulating element is interposed between the output voltage terminals, a first constant-current circuit for supplying the constant current to the voltage regulating element, a second constant-current circuit provided corresponding to the first constant-current circuit which feeds the constant current to the ground terminals connected with said voltage regulating element, and a current switching circuit interposed between the first and second constant-current circuits and the constant-current source. This circuit compares the input voltage with the output terminal voltage to introduce the constant current from the first constant-current circuit into the voltage regulating element when the input voltage is higher than the output terminal voltage. At the same time it introduces the constant current from the second constant-current circuit to the ground terminal when the input voltage is lower than the output terminal voltage.

With this constitution, as the power supply device uses no hybrid transformer, a telephone set is allowed to be made compact. In this connection, a step of installing the hybrid transformer from outside may be eliminated to achieve simplification of the manufacturing steps.

It is a second object of the present invention to provide a power supply device which may suppress fluctuations in the supply voltage due to nonuniformity of characteristics between elements.

This second object may be achieved by the following constitution. That is, the first and second constant-current circuits are constituted of each current mirror circuit, wherein the input voltage is applied through a common resistance to each emitter of the input side transistors of each current mirror circuit, while the input voltage is applied through another common resistance to each emitter of output side transistors of said each current mirror circuit.

It is a third object of the present invention to provide a power supply device which may cause no fluctuation in an input impedance thereby not to interfere with a transmitting and receiving signal.

This third object may be achieved by the following constitution. That is, the first and second constant-current circuits are constituted of each current mirror circuit, and there is provided a current switching circuit between each current mirror circuit and a constant-current source, wherein a constant current is introduced from the current mirror circuit constituting the first constant-current circuit to the voltage regulating element when the input voltage is higher than the output terminal voltage, while the constant current is introduced from the current mirror circuit constituting the second constant-current circuit to the ground terminal, thus making a current supplied from the input side apparently constant.

It is a fourth object of the present invention to shorten a rise time in a switching operation of the current switching circuit and reduce switching noise generated upon switching.

This fourth object may be achieved by the following constitution, that is, an output portion of the current mirror forming the first constant-current circuit and the output portion of the current mirror circuit forming the second constant-current circuit are partially short-circuited by a resistance. It is a fifth object of the present invention to provide a power supply device suitable for forming a semiconductor IC. Other and further objects, features and advantages of the invention will appear more fully from the following description.

DETAILED DESCRIPTION OF THE PREFERRED EMBODIMENT

Figure 1:
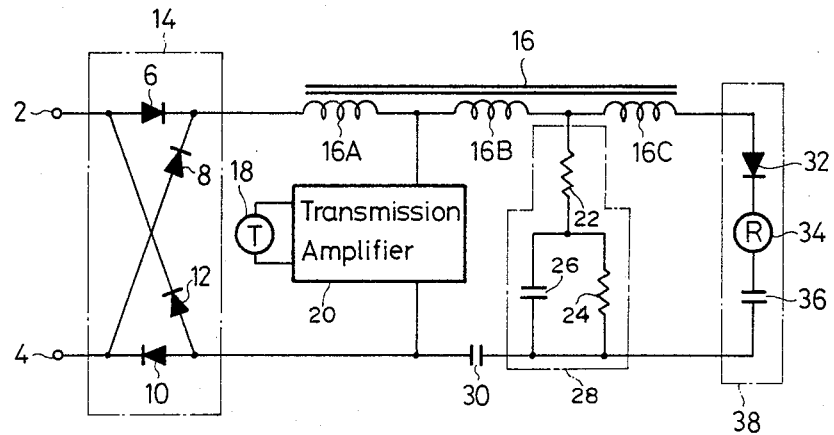
FIG. 1 is a circuit diagram of a conventional power supply device.
Figure 2:
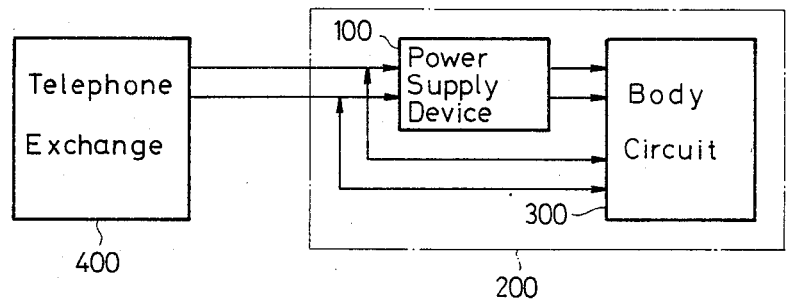
FIG. 2 is a block diagram showing the arrangement of the power supply device of the present invention.

Referring to FIG. 2, a power supply device 100 is mounted in a telephone set 200 and serves to supply the driving power to a body circuit 300. Supply voltage from a telephone exchange 400 is applied to an input terminal of the power supply device 100. The supply voltage is a DC voltage which includes a superposed AC signal, and is also applied to body circuit 300.

The power supply device 100 acts to stabilize the DC voltage from the supply and supplies same to the body circuit 300 without interfering with the AC signal. To this end, it is necessary to maintain an input impedance of the power supply device 100 at a very constant value, because changes in the input impedance interferes with the AC signal and causes in accurate AC signal not to be inputted to body circuit 300.

Figure 3:
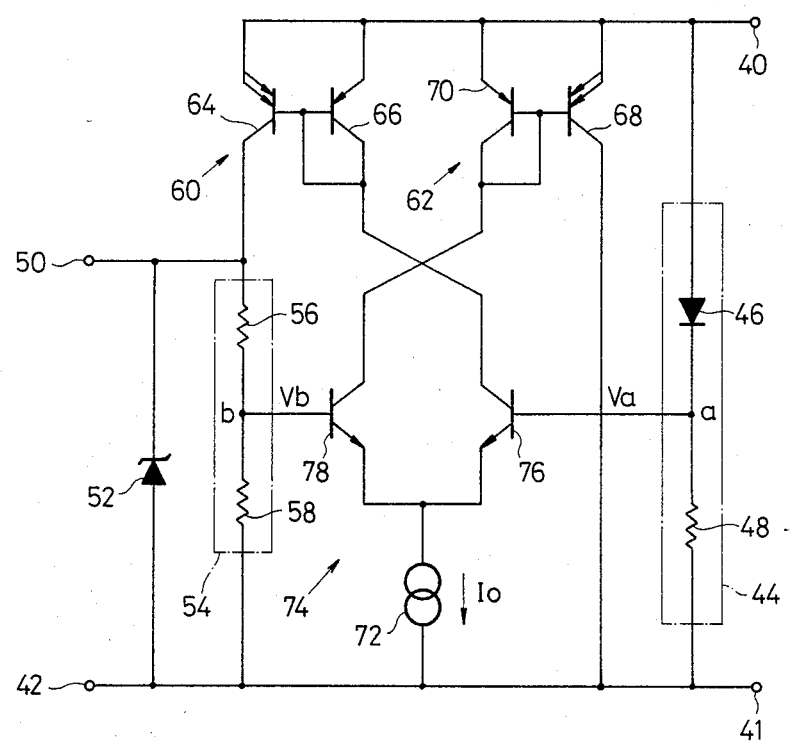
FIG. 3 is a circuit diagram showing the embodiment of the power supply device according to the present invention.

In FIG. 3 which shows the power supply device of the invention, power supply terminal 40 is provided to the input voltage terminal to which a signal voltage including a superposed AC signal is applied. There is provided a voltage dividing circuit 44 for dividing the signal voltage between power supply terminal 40 and a ground line forming common terminal 41 at its end.

Voltage dividing circuit 44 includes a diode 46, whose anode is connected to the power supply terminal 40 side, and a resistance 48 connected to diode 46 in series.

Output voltage terminal 50 is formed so as to get a constant-voltage output of the power supply device, and ground terminal 42 is formed at the other end of the common line corresponding to the ground terminal 41.

There are provided a voltage regulating element 52 between output voltage terminal 50 and the common line which anode is connected to ground terminal 41 side, and voltage dividing circuit 54 for dividing the terminal voltage between terminals 50 and 42. Voltage dividing circuit 54 includes resistances 56 and 58 connected with each other in series.

Further, there is provided on the power supply terminal 40 side a current mirror circuit 60 which is a first constant-current circuit for supplying a constant current to voltage regulating element 52 and current mirror circuit 62, which is a second constant-current circuit for emitting a constant current to ground terminals 41 and 42 side.

Namely, the current mirror circuit 60 is constituted of transistors 64 and 66, and the bases of transistors 64 and 66 are connected to each other, while emitters thereof are connected to power supply terminal 40. The collector of transistor 64 is connected to the cathode of voltage regulating element 52, and the base and the collector of transistor 66 are connected with it.

On the other hand, current mirror circuit 62 is constituted of transistors 68 and 70, and its connection is in the same manner as with current mirror circuit 60, except that the collector of transistor 68 is connected to the common line side.

There is provided a current switching circuit 74 between current mirror circuits 60 and 62 and a constant-current source 72 generates a constant current. The current switching circuit 74 comprises a current switch for comparing a divided voltage generated in voltage dividing circuits 44 and 54 and selectively switches the flow direction of the constant current.

The current switching circuit 74 is constituted of a pair of transistors 76 and 78, and the collector of transistor 76 is connected to the base and collector of transistor 66, while a collector of transistor 78 is connected to the base and collector of transistor 70. Bases of transistors 76 and 78 are independently connected to dividing points in voltage dividing circuits 44 and 54, respectively, and the emitters thereof are commonly connected with each other and connected to constant-current source 72.

Further, a voltage holding capacitor (not shown) is connected in parallel with voltage regulating element 52 between output voltage terminal 50 and the common line, thereby stabilizing an output voltage.

In operation, a signal voltage, which includes a superposed transmitting and receiving signal and DC power from a power supply on the telephone exchange side to the telephone circuit, is applied between power supply terminal 40 ground terminal 41. The signal voltage is divided by voltage dividing circuit 44, and the divided voltage Va, generated at a point (a), is applied to the base of transistor 76 in current switching circuit 74.

In addition to this, there is generated a regulated voltage as a power supply for a signal processing circuit between output voltage terminal 50 and ground terminal 42. It should be noted that terminals 42 and 41 are connected and thus can be considered as a commond ground. The regulated voltage output is divided by voltage dividing circuit 54, and divided voltage Vb generated at point (b) is applied to the base of transistor 78. In this way, the divided voltages, Va and Vb, applied to the bases of the transistors 76 and 78, respectively, are compared with each other by the transistors 76 and 78.

If a constant current generated by the constant-current source 72 is Io, the constant current Io is selectively switched to either of current mirror circuits 60 or 62 in dependence upon a level differential between the voltages Va and Vb. In other words, when voltage Va generated in the voltage dividing circuit 44 is higher than voltage Vb generated in the voltage dividing circuit 54, an output current of current mirror circuit 60 is supplied to voltage regulating element 52. When the relation in the level differential between the above-mentioned voltage is reversed, the current of current mirror circuit 60 is cut off, and the current of circuit 62 is introduced to the common ground designated by 41 and 42. If a current amplification factor of current mirror circuits 60 and 62 is K, each output current becomes k times Io, that is, K·Io.

In switching the constant current Io by current switching circuit 74, when transistor 64 constituting current mirror circuit 60 secures a minimum collector-emitter voltage Vce sufficient for its linear operation, the voltage dividing circuits 44 and 54 are set in such a way that a potential at power supply terminal 40 is rendered higher by voltage Vce than the voltage at output voltage terminal 50.

Figure 4:
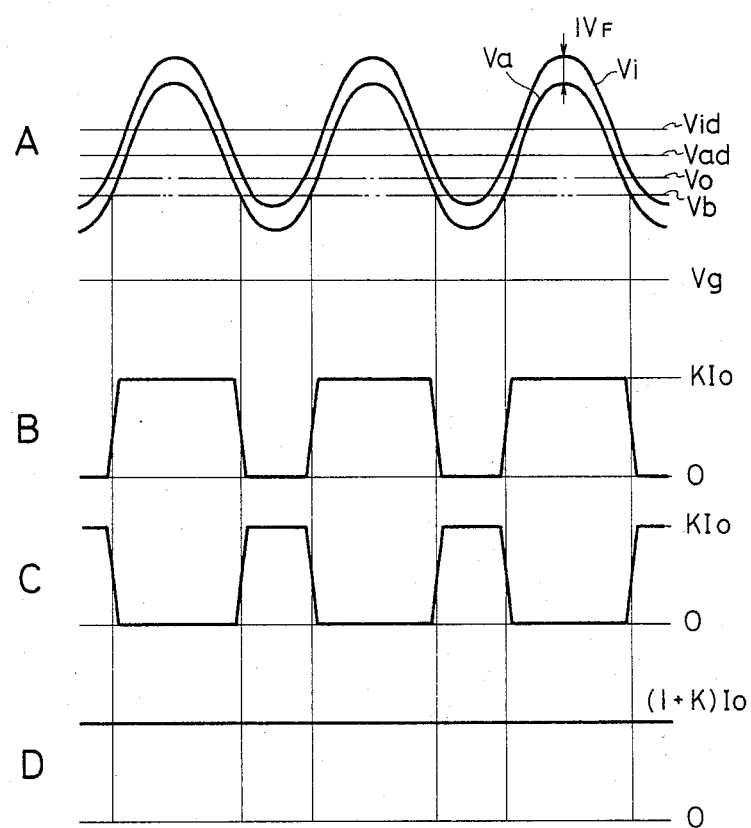
FIG. 4 is a waveform chart in operation according to the present invention.

The above-mentioned operation will be described with reference to waveforms as shown in FIG. 4.

In FIG. 4A, Vi and Vid indicates a waveform of a signal voltage to be supplied to power supply terminal 40 and its average potential (DC), respectively. Va and Vad indicate a waveform of a signal voltage generated at the point (a) in voltage dividing circuit 44 and its average potential (DC voltage), respectively.

Further, Vo, Vb and Vg indicate a potential generated at the constant-voltage output voltage terminal 50, the potential at the point (b) in the voltage dividing circuit 54 and the potential at the ground terminal 42, respectively.

In this case, when the signal voltage applied to the power supply terminal 40 is sufficiently higher than the potential at output voltage terminal 50, the constant current Io is varied to K·Io (where K is the current amplification factor) and fed to voltage regulating element 52. In FIG. 4B, the above-mentioned constant current is shown.

When the signal voltage to be applied to the power supply terminal 40 decreases to a value near the potential at output voltage terminal 50, and the value becomes lower than a voltage determined by adding the collector-emitter voltage Vce of transistor 64 to the output voltage, the current switching circuit 74 switches the constant current Io flowing in current mirror circuit 60 to current mirror circuit 62, and accordingly the constant current is introduced to the ground terminal 42. In FIG. 4C, the above-mentioned constant current is shown, wherein transistor 68 in the current mirror circuit 62 is not saturated even when voltage Vi decreases to a value lower than the output voltage Vo, and continues to be linear.

As a result, a current flowing into the power supply terminal 40 is always maintained at a constant value of (1+K) Io as shown in FIG. 4D.

Accordingly, the impedance presents a rather high resistance value of tens of KΩ to hundreds of KΩ which is substantially dependent upon the output admittance (hoe) of the transistors in current mirror circuits. The value is sufficiently higher than a circuit resistance of hundreds of ohms to two thousand ohms; that is, the resistance in a telephone circuit, thereby suppressing influence to a channel signal to a negligible extent.

By applying this power supply device, a constant current is supplied by the constant-current circuit to a power supply for a signal processing circuit, and even when a voltage is instantaneously decreased to such an extent that the constant-current circuit discontinues to be linearly operated, the constant current is fed from the constant-current circuit to the ground terminals 41 and 42, thus obtaining such an operation that the current supplied from an input side is rendered apparently constant.

Therefore, with the assistance of this power supply device, even when the instantaneous voltage becomes nearly 1 Volt, it is possible to obtain an output of 2 Volts of regulated power for a circuit without changing the power supply impedance.

Figure 5:
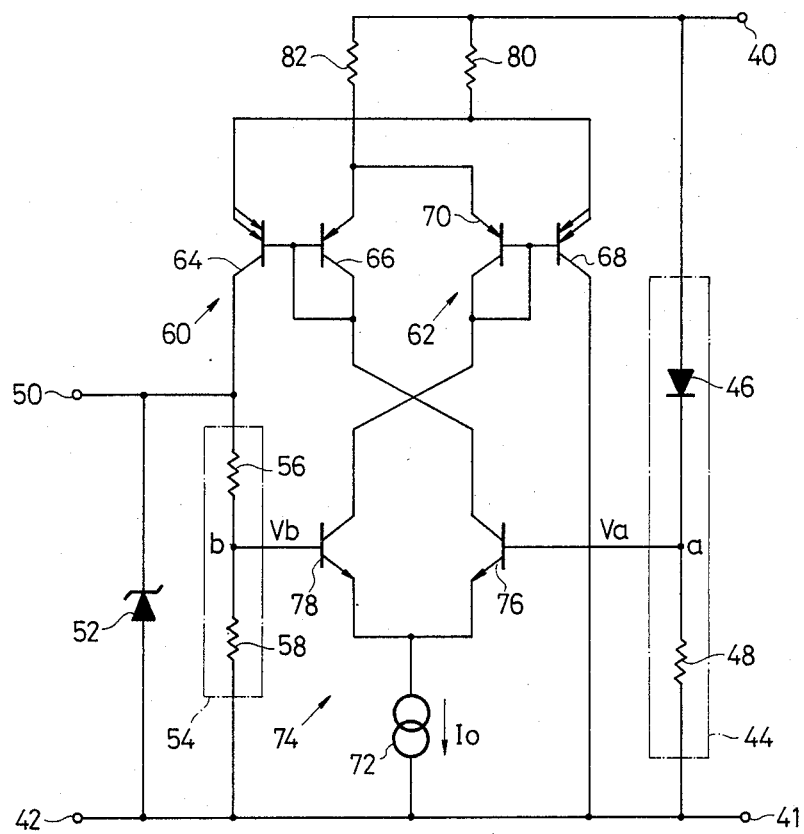
FIGS. 5 and 6 are circuit diagrams showing other embodiments of the present invention.

Referring to FIG. 5 which shows another embodiment of the invention, the power supply device includes a resistance 80 interposed between power supply terminal 40 and the emitters of transistors 64 and 68 and resistance 82 connected between power supply terminal 40 and the emitters of transistors 66 and 70. With this constitution, it is possible to suppress fluctuations in the supply voltage due to nonuniformity of characteristics between elements.

Figure 6:
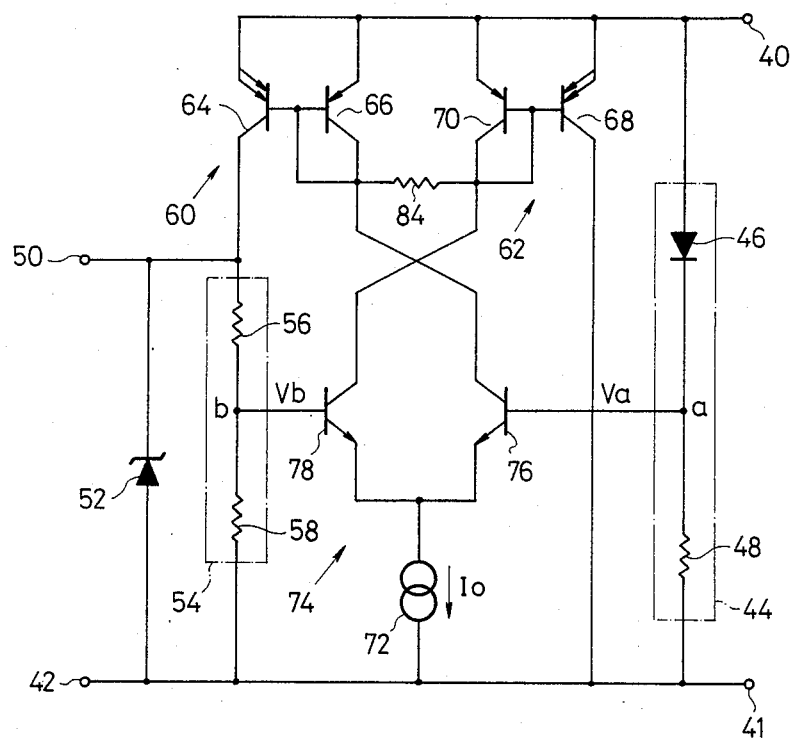

Referring next to FIG. 6 which shows a further embodiment of the invention, the power supply device includes a resistance 84 interposed between the base-collector of the transistor 66 and the base-collector of the transistor 70, so that a micro current may be fed from the current mirror circuit 62 and 60 on continuity side to the current mirror circuit 60 or 62 to be broken by the current switching circuit 74. With this constitution, upon switching the circuit to a continuity condition, it is possible to shorten the rise time and reduce and switching noise in the operation of current switching circuit 74.

As is above described, according to the present invention, a DC regulated voltage may be remarkably and easily obtained by a power supply which accommodates a superposed AC signal without using a conventional transformer, and even when an input voltage is instantaneously decreased to such an extent that a constant-current circuit cannot be linearly operated, it is possible to feed a current to a ground terminal on the basis of the switching operation of each constant-current circuit, thereby maintaining a supply current from the input side at an apparently constant value. Further, in case of great reduction in an instantaneous voltage, it is possible to form a regulated power supply for a circuit which does not change its common impedance and not interfere with a transmitting and receiving signal.

Further, as the power supply device of the present invention uses no hybrid transformer, it is suitable for forming a semi-conductor IC, thereby allowing a telephone set to be made very compact. In this connection, the step of installing the hybrid transformer from outside may be eliminated to achieve simplification of the manufacturing process.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. In a power supply device having an input voltage terminal, an output voltage terminal and a ground terminal, an input voltage fed to the device between the input voltage and ground terminals and an output voltage generated between the output voltage and ground terminals, the power supply device comprising:
   a constant current source for generating a constant current;
   a voltage regulating element interposed between the output voltage and ground terminals, the voltage regulating element having a first end connected to the output voltage terminal and a second end connected to the ground terminal;
   a first constant-current circuit electrically connected to the voltage-regulating element for supplying the constant current thereto;
   a second constant-current circuit electrically connected to the ground terminal for feeding the constant current thereto;

a current switching circuit interposed between and electrically connected to the first and second constant-current circuits, the current switching circuit further connecting electrically to the constant-current source; wherein the current switching circuit compares the input voltage to the output voltage for initiating the first constant-current circuit to supply the constant current to the voltage-regulating element when the input voltage is greater than the output voltage and for initiating the second constant-current circuit to supply the constant current to the ground terminal when the input voltage is smaller than the output voltage.

2. The power supply device as defined in claim 1, wherein said device is a semi-conductor integrated circuit.

3. The power supply device as defined in claim 1, wherein said device is used as a power supply device for a telephone set or an electronic equipment.

4. The power supply device as defined in claim 1, wherein said first and second constant-current circuits each comprises a current mirror circuit.

5. The power supply device as defined in claim 4, wherein the input voltage is applied through a common resistance to each emitter of input transistors of each of the current mirror circuits, and wherein the input voltage is further applied through another common resistance to each emitter of output transistors of each of the current mirror circuits.

6. The power supply device as defined in claim 4, wherein an input portion of said current mirror circuit forming said first constant-current circuit and an input portion of said current mirror circuit forming said second constant-current circuit are partially short-circuited by a resistance.

* * * * *